UNITED STATES PATENT OFFICE.

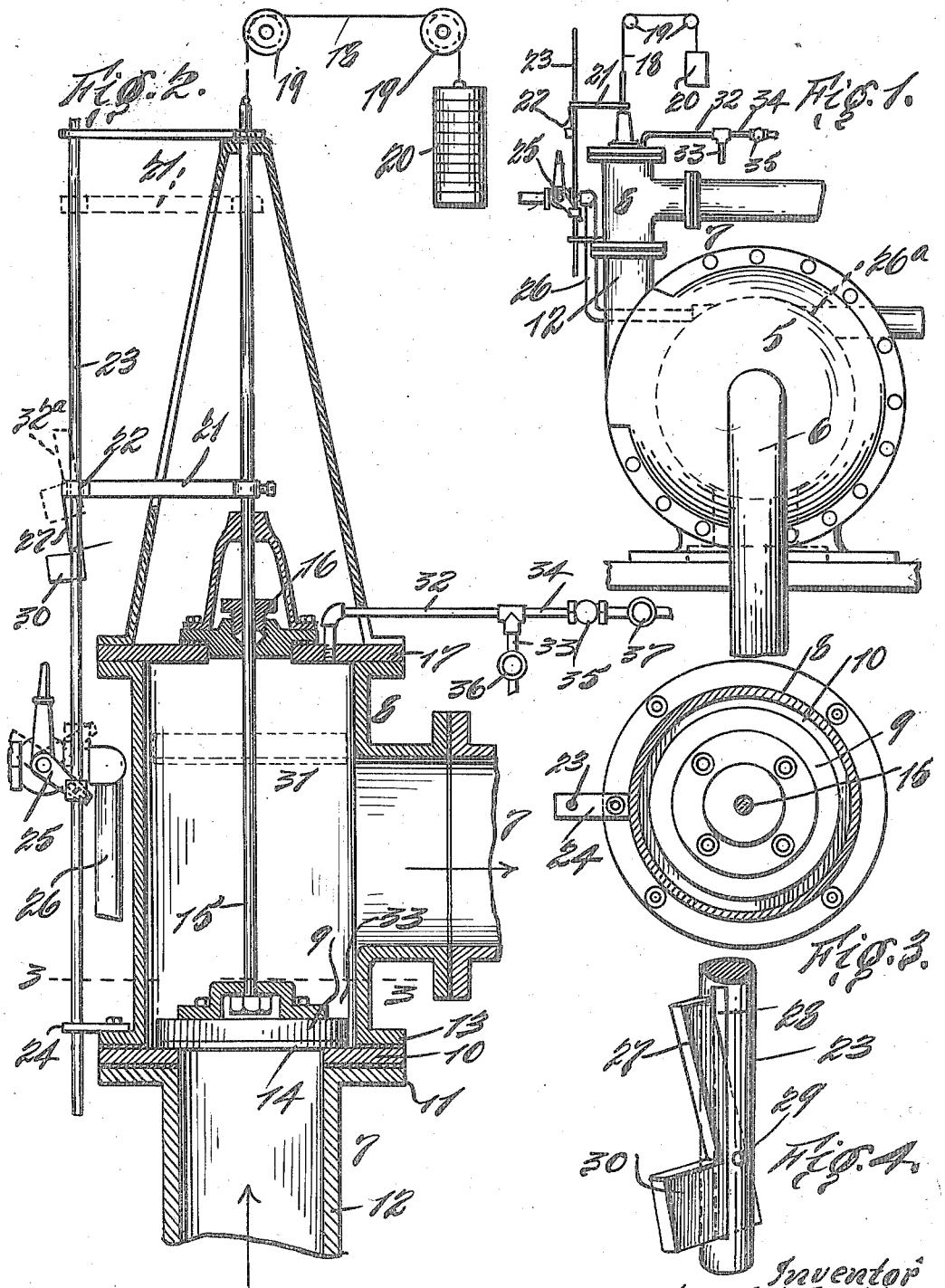

GUSTAF H. LANDSTROM, OF NEW YORK, N. Y., ASSIGNOR OF ONE-HALF TO HARRY ENGLANDER, OF NEW YORK, N. Y.

SEALING MEANS FOR CENTRIFUGAL PUMPS.

1,286,356.

Specification of Letters Patent.

Patented Dec. 3, 1918.

Application filed April 25, 1918. Serial No. 230,620.

*To all whom it may concern:*

Be it known that I, GUSTAF H. LANDSTROM, a subject of the King of Sweden, residing at New York city, county and State of New York, have invented certain new and useful Improvements in Sealing Means for Centrifugal Pumps, of which the following is a full, clear, and exact description.

This invention relates to a device to maintain the priming of centrifugal pumps and is in the nature of a check-valve located in the discharge line of the pump. The object of this valve, the operation of which is automatic and dependent upon the flow of water in the discharge line, is to prevent air from entering that portion of the line located between it and the source of water supply, said supply being the body of water to be pumped, for instance, the water in a well, cofferdam, or the like. The valve is located preferably adjacent the pump in the discharge line and is intended to prevent air from entering the line, as has been stated, between it and the source of supply should the supply fail, due to accident or for any other reason. When the supply fails, the valve will close and seal the line. The water left in the discharge pipe will flow back into the valve casing and produce a seal; hence air cannot get into that portion of the line sealed by the valve. The descending column of water beneath the valve will produce a partial vacuum in the line beneath the valve; hence the pump will be primed or in condition to be again started. The failure of the supply is termed "losing the prime"; hence my improved valve is arranged to prevent the losing of the prime for the pumps. This is the main object of the invention. In combination with the valve, I provide means to shut off the power for the pump when the valve operates to seal the line.

In connection with the following detailed description of my improved device, reference will be had to the accompanying drawing, forming part hereof, wherein:—

Figure 1 is a diagrammatic side view of a pump, a portion of a suction line, and a portion of a supply line equipped with my improvement;

Fig. 2 is an enlarged sectional view of the valve casing illustrating also a portion of the discharge line, the valve being illustrated in elevation;

Fig. 3 is a sectional plan view, the section being taken on a line 3—3 in Fig. 2; and Fig. 4 is an enlarged detail perspective view of the latch for controlling the operation of the valve rod to shut off the power for the pump operating device.

In Fig. 1, I have illustrated a centrifugal pump, indicated by 5, the suction line for the pump being indicated by 6 and the discharge line by 7. In the discharge line 7 I locate, preferably adjacent the pump (in this instance) a T-casing 8 for a check-valve 9 arranged to seal or close off the discharge line 7 by means of a coöperating seat-member 10 in the form of a gasket-plate located between the flange 11 of the discharge line member 12, and the flange 13 of the valve casing. The valve 9 carries a facing 14 of rubber, leather or any other material suitable to form a tight joint with the seat-member 10. The valve 9 is connected to the lower end of a stem 15 which passes through a stuffing-box 16 in the head 17 of the casing. The upper end of the stem has connected thereto a cable 18 passing over idlers 19. The free end of the cable is connected to a counterweight 20 provided for the purpose of balancing the valve 9.

The valve-stem 15 has secured thereto, exteriorly of the valve casing, an arm 21 having a guide 22 at its outer end to slidably engage and support a valve operating rod 23. The rod 23 is guided at its lower end by a bracket 24 carried by the flange 13 of the valve casing. Intermediate its ends the valve operating rod 23 is connected to an auxiliary throttle or shut-off valve 25 located in the supply-line 26 for the fan operating device should said device be a steam turbine 26ª or other device employing steam or compressed air. If an electric operating means is employed, the rod 23 would be connected to a cut-out switch located in the motor-circuit. Whatever the power may be, the rod 23 will operate a cut-out device which is supplemental to the main switch, or main throttle for the power device.

The rod 23 is connected with the stem 15 in such manner as to cause the rod 23 to shut the power off during the descent of the valve 9 to seal the line, but to permit the rod 23 to be raised to turn on the power without lifting the valve 9. To this end I provide the rod 23 with a latch 27 pivoted in a slot 28, at 29, in the said rod 23 (see Fig. 4).

The latch carries a weight 30 which tends to normally throw the upper end of said latch outwardly to engage the supporting arm 21. In fact the normal position of the latch will be as indicated in Fig. 2, whether the valve 9 be closed, as per full lines, Fig. 2, or open, as per dotted lines in said Fig. 2. The dotted lines at 31 indicate the position of the valve 9 when the pump is operating and the discharge line 7 is filled with water or other element being pumped.

In combination with the valve 9, I employ a tell-tale consisting of a pipe 32, connected with the casing, having a valve-controlled outlet 33, said pipe 32 being also connected to a supply line 34 having a check-valve 35. The tell-tale is designed to keep the engineer informed as to whether the pump is working to his satisfaction. During the operation of the pump, water will flow through the outlet 33, the valve 36 being of course open. Should the engineer desire to let water into the casing 8 from a suitable source of supply to produce a seal, he will shut valve 36 and open valve 37 in the supply line 34. The check valve 35 is to prevent water from the pump, which might be salt water, or dirty water, from being forced into the fresh water supply with which the line 34 might be connected.

To start the pump, the latch 27 will be pushed into the slot 28 until its upper end alines with the opening in the guide 22; the rod 23 can now be pulled up to open the valve 25. When the valve 25 is opened (the main throttle being open) the pump will start, assuming it to have been primed, thereby forcing water through the discharge line. When the water flows through the discharge opening, the valve 9 will be forced upwardly, or opened, to the dotted line position, Fig. 2. When the valve opens, the stem 15 will, of course, rise, carrying the arm 21 with it. As soon as the guide 22 leaves the latch 27, the said latch will be moved by its weight 30 to its normal position, as shown by dotted lines 32ª, Fig. 2. It will be remembered that when the rod 23 was moved upwardly, to open the valve, the latch was moved into its slot 28, after which said rod was pulled up, the guide 22 keeping the latch within the slot. When the valve-stem rises, the latch will fall out of the slot to the said normal position, which places it in the path of movement of the guide 22, when the valve drops. Should the supply of water fail, the valve 9 will drop onto its seat 10, thereby sealing the line between it and the source of supply. The water remaining in the discharge line 7 will flow back into the casing and into the space 33; hence will aid in maintaining the valve air-tight. When the valve drops the supplemental throttle valve 25 will close, thereby shutting off the power for the pump-operating device. If the pump is electrically driven, the current will be shut off, or the circuit broken. During the closing of the valve, the column of water in the suction line will drop, thereby producing a partial vacuum in the line; hence the pump is in condition or primed, for a subsequent operation. If no provision was made to prevent it, air would flow into the suction line, while the column of water therein was falling; hence to again start the pump the air would have to be exhausted by a siphon or by pouring water into the suction line. It will therefore be apparent that my improved valve mechanism is of great advantage, as it obviates the necessity of priming the pump every time it is stopped, before it can be again operated. The object of shutting the power off, should the water supply fail, is to prevent the pump from racing and becoming injured.

What I claim as my invention is:

1. In combination with a hydraulic pump, a discharge line, including a valve casing inserted in said line, a valve in said casing arranged to close the line, should the water supply fail, and a supplemental water supply connected to the casing.

2. The combination of a hydraulic pump having a suction line and a discharge line, a motor for the pump, a valve to automatically close the discharge line should the water supply fail, and means operable by the movement of the valve to simultaneously shut off the power for the motor.

3. A valve casing arranged for insertion in the discharge line of a hydraulic pump, a valve within same arranged to be opened by the flow of water through said casing in one direction, said valve being arranged to close by gravity, a stem connected to the valve, and means operable by the movement of the stem to control the operation of the power mechanism for a pump.

4. The combination of a hydraulic pump, a valve located in the discharge line thereof, arranged to close by gravity, a stem for said valve, a shut-off device for the power mechanism for said pump, means operable by the movement of the stem to operate said shut-off device, and means to disconnect said power shut-off device and the stem of said valve to permit the power to be turned on without moving said valve.

5. The combination of a hydraulic pump, a gravity operated valve located in the discharge line thereof, a stem for said valve, a shut-off device for the power mechanism for said pump, a rod to actuate same, an arm carried by the valve-stem slidably engaging said rod, and a latch mechanism carried by the rod, adapted to engage said arm when said valve lowers but to permit said rod to be raised, to turn on the power for the power mechanism without raising said valve.

6. In combination with the discharge line of a hydraulic pump, a gravity operated valve to seal said line should the water supply fail, a supplemental water supply line for said pump located adjacent said valve, and a tell-tale located in said supplemental water supply line.

7. In combination with the discharge line of a hydraulic pump, a gravity operated valve to seal said line should the water supply fail, a supplemental water supply line for said pump located adjacent said valve, a tell-tale located in said supplemental water supply line, and a check valve located in said supplemental water supply line to prevent water from said discharge line from being forced through said supplemental water supply line.

Signed at New York city, N. Y., this 24 day of April, 1918.

GUSTAF H. LANDSTROM.

Witnesses:
 EDWARD A. JARVIS,
 MAURICE BLOCK.